(12) United States Patent
Chan et al.

(10) Patent No.: US 10,834,269 B2
(45) Date of Patent: Nov. 10, 2020

(54) SPECIALIZED SECONDARY COMPARTMENT IN A MOBILE DEVICE

(71) Applicant: INTERNATIONAL BUSINESS MACHINES CORPORATION, Armonk, NY (US)

(72) Inventors: Yuk L. Chan, Rochester, NY (US); Al Chakra, Apex, NC (US); Jian Jun Wang, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/149,174

(22) Filed: Oct. 2, 2018

(65) Prior Publication Data

US 2020/0106890 A1 Apr. 2, 2020

(51) Int. Cl.
*G06F 1/26* (2006.01)
*G06F 1/28* (2006.01)
*H04M 19/08* (2006.01)
*G06F 11/14* (2006.01)
*G06Q 20/40* (2012.01)
(Continued)

(52) U.S. Cl.
CPC ............ *H04M 19/08* (2013.01); *G06F 1/263* (2013.01); *G06F 1/28* (2013.01); *G06F 11/1458* (2013.01); *G06Q 20/40* (2013.01); *H02J 7/0068* (2013.01); *H02J 7/342* (2020.01); *G06F 2201/84* (2013.01)

(58) Field of Classification Search
CPC .......... H04M 19/08; G06F 1/263; G06F 1/28; G06F 11/1458; G06F 2201/84; H02J 7/0054; H02J 7/0068; G06Q 20/40
See application file for complete search history.

(56) References Cited

U.S. PATENT DOCUMENTS 5,835,366 A * 11/1998 Pleso .................... H02J 7/0065
                                                363/59
6,240,285 B1    5/2001 Blum et al.
(Continued)

FOREIGN PATENT DOCUMENTS

WO        2015148850 A1    10/2015

OTHER PUBLICATIONS

Chan et al., "Preauthorization of Mobile Payments Expected in a Reduced-Functionality State," U.S. Appl. No. 16/149,177, filed Oct. 2, 2018.
(Continued)

*Primary Examiner* — Dong-Chang Shiue
(74) *Attorney, Agent, or Firm* — Cantor Colburn LLP; Teddi Maranzano

(57) ABSTRACT

A computer-implemented method includes identifying critical data on a primary storage of a mobile device, where the primary storage is powered by a primary battery component. The critical data is backed up from the primary storage to a secondary storage. A charge level of the primary battery component is detected. It is determined that the charge level of the primary battery component is less than a minimum threshold. The mobile device is switched from a primary mode to a secondary mode, based on the charge level being less than the minimum threshold. A secondary battery component powers the secondary storage in the secondary mode, and the critical data is accessible on the secondary storage in the secondary mode.

18 Claims, 6 Drawing Sheets

(51) Int. Cl.
*H02J 7/00* (2006.01)
*H02J 7/34* (2006.01)

(56) References Cited

U.S. PATENT DOCUMENTS

| | | | |
|---|---|---|---|
| 6,345,180 | B1 | 2/2002 | Reichelt |
| 6,668,179 | B2 | 12/2003 | Jiang |
| 7,255,264 | B2 | 8/2007 | De Leon |
| 8,014,755 | B2 | 9/2011 | Sun |
| 8,369,904 | B2 | 2/2013 | Bennis |
| 8,768,419 | B2 | 7/2014 | Sivaraman |
| 9,565,639 | B2 | 2/2017 | Ray |
| 9,838,861 | B2 | 12/2017 | Singh |
| 2004/0023679 | A1* | 2/2004 | Shoobridge .......... H04B 1/1027 455/522 |
| 2012/0135715 | A1 | 5/2012 | Kang et al. |
| 2014/0277277 | A1* | 9/2014 | Gordon ................. A61N 1/378 607/59 |
| 2015/0046324 | A1 | 2/2015 | De La Cropte De Chanterac |
| 2016/0189131 | A1* | 6/2016 | Williams .......... H04W 52/0261 705/39 |
| 2018/0096405 | A1 | 4/2018 | Cho |
| 2018/0226697 | A1* | 8/2018 | Edwards ........... H01M 10/0525 |
| 2019/0129865 | A1* | 5/2019 | Fenster ............... G06F 12/1408 |

OTHER PUBLICATIONS

List of IBM Patents or Patent Applications Treated as Related; Date Filed: Oct. 2, 2018, 2 pages.

Merritt, C. (2011). Mobile money transfer services: the next phase in the evolution of person-to-person payments. Journal of Payments Strategy & Systems, 5(2), pp. 143-160. Aug. 2010.

German, Kent "Why you want a dual-SIM phone", retrieved at: https://www.onet.com/news/why-you-want-a-dual-sim-phone/; dated Feb. 28, 2013; 4 pgs.

* cited by examiner

SPECIALIZED SECONDARY COMPARTMENT IN A MOBILE DEVICE

BACKGROUND

The present invention relates to mobile devices and, more specifically, to a specialized secondary compartment in a mobile device.

Smartphones are widespread, and their functionality is continuously expanding. As the usefulness of these devices increases, so does people's reliance on them. When smartphones were first introduced, they were useful for their various communication mechanisms, such as phone calls, text messages, and emails, as well as their ability to store information in an organized manner, such as through digital calendars. Now, however, smartphones also incorporate mobile payments systems, tickets with barcodes, and other documents and functionality that people rely on for everyday tasks.

SUMMARY

Embodiments of the present invention are directed to a computer-implemented method for implementing a secondary compartment of a mobile device. A non-limiting example of the computer-implemented method includes identifying critical data on a primary storage of a mobile device, where the primary storage is powered by a primary battery component. The critical data is backed up from the primary storage to a secondary storage. A charge level of the primary battery component is detected. It is determined that the charge level of the primary battery component is less than a minimum threshold. The mobile device is switched from a primary mode to a secondary mode, based on the charge level being less than the minimum threshold. A secondary battery component powers the secondary storage in the secondary mode, and the critical data is accessible on the secondary storage in the secondary mode.

Embodiments of the present invention are directed to a system for implementing a secondary compartment of a mobile device. A non-limiting example of the system includes a memory having computer-readable instructions and one or more processors for executing the computer-readable instructions. The computer-readable instructions include identifying critical data on a primary storage of a mobile device, where the primary storage is powered by a primary battery component. Further according to the computer-readable instructions, the critical data is backed up from the primary storage to a secondary storage. A charge level of the primary battery component is detected. It is determined that the charge level of the primary battery component is less than a minimum threshold. The mobile device is switched from a primary mode to a secondary mode, based on the charge level being less than the minimum threshold. A secondary battery component powers the secondary storage in the secondary mode, and the critical data is accessible on the secondary storage in the secondary mode.

Embodiments of the invention are directed to a computer-program product for implementing a secondary compartment of a mobile device, the computer-program product including a computer-readable storage medium having program instructions embodied therewith. The program instructions are executable by a processor to cause the processor to perform a method. A non-limiting example of the method includes identifying critical data on a primary storage of a mobile device, where the primary storage is powered by a primary battery component. Further according to the method, the critical data is backed up from the primary storage to a secondary storage. A charge level of the primary battery component is detected. It is determined that the charge level of the primary battery component is less than a minimum threshold. The mobile device is switched from a primary mode to a secondary mode, based on the charge level being less than the minimum threshold. A secondary battery component powers the secondary storage in the secondary mode, and the critical data is accessible on the secondary storage in the secondary mode.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
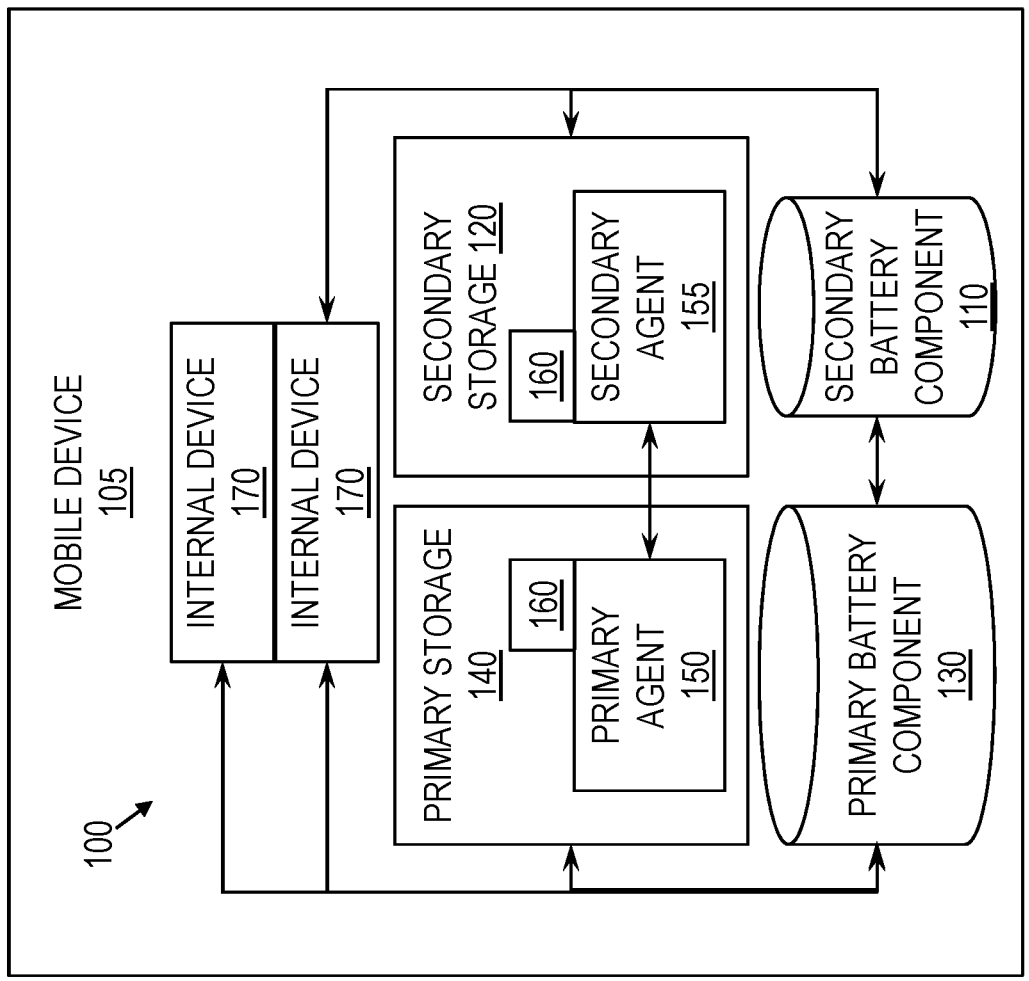
FIG. 1 is a block diagram of a compartmentalization system in a mobile device, according to some embodiments of this invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, people have come to rely heavily on smartphones and other mobile devices for their everyday needs. While smartphones provide a convenient way to keep documents and functions in one place, the reliability of a smartphone hinges on its battery life. For instance, if a user relies on her smartphone to pay for groceries, maintain her movie tickets, or maintain her insurance card, and she does not carry a means of alternative payment or a hard copy of the movie ticket or insurance card, then payments, the movie ticket, and proof of insurance become unavailable if the phone must shutdown due to low battery power.

Turning now to an overview of the aspects of the invention, one or more embodiments of the invention address the above-described shortcomings of the prior art by providing a secondary compartment in a mobile device, such as a smartphone. The secondary compartment may include a secondary battery component and a secondary storage, which are in addition to a primary battery component and a primary storage included in a primary compartment of the mobile device. The secondary compartment may be reserved and maintained for use when the primary battery component is out of power. Specifically, for instance, the secondary storage may maintain critical data, and that critical data may be updated from time to time based in part on the estimated time remaining in the primary battery component. When the primary battery component is out of power, the secondary battery component may be used to access the critical data in the secondary storage, thus enabling a user to access that critical data even when many of the mobile device's functions are unavailable.

The above-described aspects of the invention address the shortcomings of the prior art by enabling a user to access critical data when a smartphone's primary battery component is low or dead. As a result, a user can rely confidently on having access to that critical data, without having to worry that normal usage of the smartphone will drain the battery and impact the user's ability to access and use the critical data.

Turning now to a more detailed description of aspects of the present invention, FIG. 1 is a block diagram of a compartmentalization system 100 in a mobile device 105, according to some embodiments of this invention. As shown in FIG. 1, the compartmentalization system 100 may be incorporated into a mobile device 105, which may be a smartphone or tablet, for example. Specifically, the compartmentalization system 100 may include a secondary battery component 110 and a secondary storage 120, which may be in addition to a primary battery component 130 and a primary storage 140. As shown in FIG. 1, the primary battery component 130 may power the primary storage 140, while the secondary battery component 110 may power the secondary storage 120. Each of the primary storage 140 and the secondary storage 120 may include a respective agent referred to herein as the primary agent 150 and the secondary agent 155 respectively. The primary agent 150 may manage activities of the compartmentalization system 100 that occur when the mobile device 105 is in primary mode, which will be described in more detail below, while the secondary agent 155 may manage activities of the compartmentalization system 100 that occur with the mobile device 105 is in secondary mode, which will also be described below. For instance, the primary agent 150 may run from the primary storage 140 and may be responsible for backing up critical data 160 to the secondary storage 120, and the secondary agent 155 may run in the secondary storage 120 and may be responsible for delivering the critical data 160 to a user when the mobile device 105 is in secondary mode. In some embodiments of the invention, the secondary agent 155 may be active only when the mobile device 105 is in secondary mode.

Generally, the compartmentalization system 100 may enable the existence of two modes of the mobile device 105:

primary mode and secondary mode, also referred to as full mode and limited mode, respectively. The primary battery component 130 and the primary storage 140 may be utilized by the mobile device 105 when the mobile device 105 is in primary mode. For instance, for conventional usage of the mobile device in primary mode (e.g., communications, storage, mobile payment systems, gaming, watching videos, and other functionality), the primary storage 140 and primary battery component 130 may be used for storage and power respectively. As such, various internal devices 170 of the mobile device 105 (e.g., central processing unit (CPU), screen, Bluetooth device, near-field communication (NFC) device, fingerprint reader, and other devices) may be connected to the primary battery component 130 and powered by the primary battery component 130 to enable usage of these internal devices 170 in primary mode. Additionally, when the mobile device 105 is in primary mode, the compartmentalization system 100 may provide an improvement in that the primary agent 150 may occasionally back up critical data 160 in the primary storage 140 to the secondary storage 120. Further, when the mobile device 105 is in primary mode, the primary battery component 130 may transfer power to the secondary battery component 110 as needed to ensure that the secondary battery component 110 can power the mobile device 105 when the mobile device 105 switches to secondary mode.

When the primary battery component 130 has insufficient charge to power the mobile device 105 in primary mode, then the compartmentalization system 100 may automatically switch the mobile device 105 into secondary mode. For instance, a minimum threshold may be established for the primary battery component 130. When the charge level of the primary battery component 130 is less than the minimum threshold, then the compartmentalization system 100 may switch the mobile device 105 into secondary mode. The minimum threshold may be zero power, for example, such that when the primary battery component 130 is empty, the mobile device 105 switches into secondary mode.

When the mobile device 105 is in secondary mode, the secondary battery component 110 and the secondary storage 120 may provide the user continued access to the critical data 160 on the mobile device 105, as this critical data 160 may have been previously backed up to the secondary storage 120. In secondary mode, the mobile device 105 may be powered by the secondary battery component 110, which may be connected to and may power one or more other internal devices 170 of the mobile device 105 needed for a user to access the critical data 160. These one or more internal devices 170 may be a subset of the internal devices 170 that are also connected to the primary battery component 130 and powered by the primary battery component 130 in primary mode. For example, the internal devices 170 connected to the secondary battery component 110 may be the secondary storage 120 in addition to a proper subset of the internal devices 170 connected to the primary battery component 130. Alternatively, all of the internal devices 170 connected to the primary battery component 130 may also be connected to the secondary battery component 110, but the secondary battery component 110 need not supply power to all of such internal devices 170 in secondary mode. Thus, the secondary battery component 110 may enable the mobile device 105 to maintain a subset of its functionality in secondary mode. This subset may cause the secondary battery component 110 to drain more slowly than the primary battery component 130 would drain while supporting the various internal devices 170. Depending on the type of access to and use of the critical data 160 that is desired, one of skill in the art will understand which internal devices 170 of the mobile device 105 are necessary for accessing and utilizing the critical data 160 in secondary mode and may thus be connected to the secondary battery component 110.

In some embodiments of the invention, the secondary battery component 110 is a distinct device from the primary battery component 130, but alternatively, the secondary battery component 110 and the primary battery component 130 may be portions of a single battery, such that they are distinct partitions where the partitioning is either virtual or physical. If the primary battery component 130 and the secondary battery component 110 are distinct devices, then the primary battery component 130 may be used to maintain an appropriate charge level in the secondary battery component 110, as will be described below. If the primary battery component 130 and the secondary battery component 110 are portions of the same battery, then the battery may be physically partitioned or a charge level (e.g., 20%, or 5 hours of running time) of that battery may be assigned to the secondary battery component 110. If a charge level is assigned to the secondary battery component 110, then the remaining charge level may represent the primary battery component 130. In that case, the mobile device 105 may be switched from primary mode to secondary mode when the charge level of the battery falls to the charge level assigned to the secondary battery component 110, in which case the remaining charge represents the secondary battery component 110.

In some embodiments of the invention, the primary battery component 130 and the secondary battery component 110 may have different power consumption characteristics. For instance, in some embodiments of the invention, only the primary battery component 130 is responsible for powering the mobile device 105 when the mobile device is in primary mode, while only the secondary battery component 110 is responsible for powering the mobile device 105 when the mobile device 105 is in secondary mode. Further, if the primary battery component 130 and the secondary battery component 110 are distinct batteries, then the two batteries may utilize distinct battery technologies or materials. In that case, the primary battery component 130 may be better suited for regular use and recharge (e.g., nickel-metal hydride (NiMH)), while the primary battery component 130 may be better suited for holding a charge over a long period of time (e.g., nickel cadmium (NiCd)).

If a single battery is used for the primary battery component 130 and the secondary battery component 110, there may be some drawbacks. For example, due to everyday use of the single battery, the battery may experience wear and tear that is applicable to both the primary battery component 130 and the secondary battery component 110 as both reside on the same battery. This can be avoided to some degree by partitioning the battery and charging the two partitions independently, such that the secondary battery component 110 does not experience as many recharge cycles as does the primary battery component 130. Alternatively, if the secondary battery component 110 is simply assigned a charge level, then that assigned charge level may increase over time to account for the possibility that the ability of the single battery to maintain a charge may decrease over time.

Analogously, the secondary storage 120 may be a distinct storage device from the primary storage 140, but alternatively, the secondary storage 120 and the primary storage 140 may be portions of a single storage device. For example, and not by way of limitation, a single storage device may be partitioned into the primary storage 140 and the secondary storage 120. However, if the primary storage 140 and the secondary storage 120 are distinct devices, then the two may utilize the same or different storage technologies. For example, either or both of the primary storage 140 and the secondary storage may be electrically erasable programmable read-only memory (EEPROM), such as NAND flash memory.

As mentioned above, critical data 160 of the mobile device 105 may be backed up, or copied, from the primary storage 140 to the secondary storage 120 and maintained on the secondary storage 120. In other words, a copy of the critical data 160 may be maintained in the secondary storage 120, such as by way of occasional synchronization. The identification of critical data 160 may be determined statically or dynamically, or by a combination of both. Identifying critical data 160 may be based on rules that are system-defined or user-defined. For example, and not by way of limitation, certain categories of data may be deemed to be critical data 160, where such categories may be default categories or may be selected by the user. For instance, data in the categories of payment methods (e.g., credit card information), tickets, passes, or identifications (e.g., driver's license, automobile insurance) may be deemed critical data 160. In that case, as new data is added to the mobile device 105 and is determined to be in such a category, that new data may be automatically included in the critical data 160. For another example, a user may select specific data on the mobile device 105 as critical data 160. The compartmentalization system 100 may detect which data is critical data 160 (e.g., based on the selection, or based on the category of data), and may tag that data as critical data 160. Tagging may be performed in various ways. For example, and not by way of limitation, the primary agent 150 may maintain a table identifying the locations of each piece of critical data 160.

In some embodiments of the invention, the compartmentalization system 100 may maintain various information about the critical data 160, which may include, for example, one or more of the following for each piece of critical data 160: location in the primary storage 140, an indication or when the critical data 160 was last updated in the primary storage 140, and an indication of when the critical data 160 was last updated in the secondary storage 120. For example, and not by way of limitation, if the critical data 160 is tracked by a table, then this table may also indicate a timestamp of the most recent update to that piece of critical data 160 in the secondary storage 120, as well as a timestamp of the most recent update to the critical data 160 in the primary storage 140. Thus, the difference between these timestamps may indicate whether the copy of the critical data 160 in the secondary storage 120 should be updated so that it matches the version of the critical data 160 in primary storage 140. As will be described further below, the copy of the critical data 160 stored in the secondary storage 120 may be occasionally updated to equal the critical data 160 on the primary storage 140. Whether an update occurs at a given time may be based, at least in part, on the charge level remaining in the primary storage 140, which may be indicative of whether the critical data 160 will soon be needed on the secondary storage 120.

Figure 2:
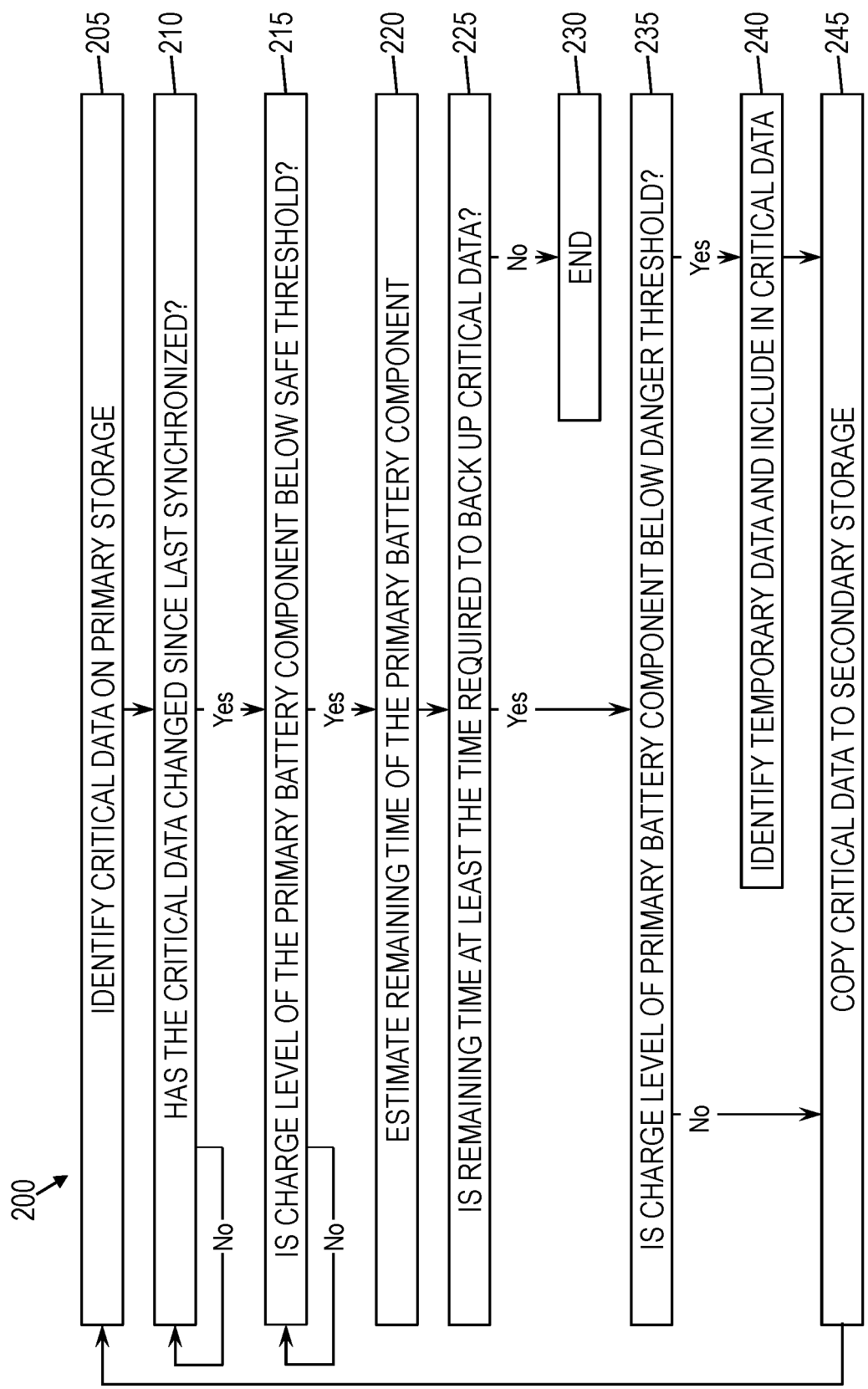
FIG. 2 is a flow diagram of a method of updating critical data stored in a second compartment of the mobile device having the compartmentalization system, according to some embodiments of the invention.

FIG. 2 is a flow diagram of a method of updating the critical data 160 stored in the secondary compartment of the mobile device 105 having the compartmentalization system 100, according to some embodiments of the invention. In other words, FIG. 2 illustrates backing up the critical data 160 from the primary storage 140 to the secondary storage 120, which may be performed from time to time. This method 200 may be performed one or more times while the mobile device 105 is in primary mode.

The time or frequency of synchronization, also referred to herein as backing up or copying, may vary based on one or more of the following, for example: current charge level of the primary battery component 130, estimated time remaining on the primary battery component 130, and power (i.e., charge level) required to complete synchronization. For instance, if the current charge level of the primary battery component 130 meets a pre-established safe threshold (e.g., 50%), then it may be assumed that the primary battery component 130 is not in danger of losing power and synchronization need not occur frequently. In some embodiments of the invention, one or more thresholds used by the compartmentalization system 100 may be user-defined or may have default values defined by the compartmentalization system 100, or both. If the charge level of the primary battery component 130 is equal to or less than the power required to synchronize the critical data 160, then no synchronization may occur because such synchronization is not likely to succeed before the primary battery component 130 dies.

In some embodiments of the invention, the compartmentalization system 100 may monitor the charge level of the primary battery component 130 and the synchronization status of the critical data 160 (e.g., whether the critical data 160 has changed in the primary storage 140 since last backed up to the secondary storage 120). The compartmentalization system 100 may initiate backup when the critical data 160 is not up to date in the secondary storage 120 and synchronization criteria are met. The synchronization criteria may be based on one or more of the following: current charge level of the primary battery component 130, estimated time remaining on the primary battery component 130, and power required for synchronization.

In the example of FIG. 2, the synchronization criteria are that (1) the charge level of the primary battery component 130 is below the safe threshold (e.g., 60%), and (2) the charge level of the primary battery component 130 is at least the power required to synchronize. As shown in FIG. 2, at block 205, the critical data 160 may be identified on the primary storage 140, as discussed above. For instance, the critical data 160 may be identified based on static rules or may be user-defined. At decision block 210, it may be determined whether the critical data 160 on the primary storage 140 has changed since last synchronized with the secondary storage 120. This may be determined based on passive monitoring or active monitoring, for example, where a table describing the critical data 160 is updated each time a piece of the critical data 160 changes. If the critical data 160 is unchanged at decision block 210, then the compartmentalization system 100 may wait until a determination is made that the critical data 160 has changed.

As discussed above, the critical data 160 may include various pieces of data, such as a driver's license, a calendar, etc. Thus, when a change is detected to the critical data 160 since the last synchronization, it will be understood that not all the critical data 160 need have been changed. Rather, if at least a portion of the critical data 160 has changed since synchronization, then the changed portion of the critical data 160 may be synchronized if the synchronization criteria are met. In that case, the synchronization referred to below may refer specifically to the portion of the critical data 160 that has changed.

In this example, at decision block 215, it may be determined whether the charge level of primary battery component 130 is below the safe threshold. If the safe threshold is met (e.g., equaled or exceeded), then the compartmentalization system 100 may wait until the safe threshold is not met.

However, if the safe threshold is not met (e.g., the charge level is below the safe threshold), then the method 200 may proceed to block 220.

At block 220, the estimated remaining time on the primary battery component 130 may be determined. This may be performed by various mechanisms known in the art to estimate remaining battery time based on, for example, historical usage data and remaining charge level. At decision block 225, it may be determined whether the remaining battery time is at least the time required to back up the critical data 160, specifically the portion of the critical data 160 that has changed since the last synchronization. For instance, based on the amount of critical data 160 or the historical time it has taken to copy the critical data 160 to the secondary storage 120, or both, the compartmentalization system 100 may estimate the time needed to copy the critical data 160 to the secondary storage 120. This time needed may be compared to the remaining battery time to ensure that there is enough time remaining on the primary battery component 130 to copy the critical data 160 to the secondary storage 120. One of skill in the art will understand that this determination is equivalent to determining whether the remaining charge level is at least the power required to synchronize the critical data 160. In some embodiments of the invention, the remaining battery time is required to exceed the estimated time to copy the critical data 160 to the secondary storage 120 by a threshold amount. This threshold amount may allow room for error, to ensure that the copying can be completed before the primary battery component 130 dies. Additionally, this threshold amount may leave room to identify temporary data for inclusion in the critical data 160, as described below.

If there is not enough battery time remaining in the primary battery component 130, then the method 200 may end at block 230. In this case, it may be deemed too late to synchronize the critical data 160. When the primary battery component 130 is recharged, then the method 200 may start over to ensure that the critical data 160 is occasionally backed up to the secondary storage 120.

However, if there is enough battery time remaining to back up the critical data 160, then at decision block 235, it may be determined whether the charge level of the primary battery component 130 is below a danger threshold (20%). Generally, the danger threshold may be defined based on when the primary battery component 130 should be considered in danger of losing all power. If the primary battery component 130 is not below the danger threshold, then the method 200 may skip to block 245.

However, if the primary battery component 130 is below the danger threshold, then temporary data may be identified and added to the critical data 160 at block 240. The inclusion of the temporary data in the critical data 160 may be temporary, spanning a critical period that extends from a current time (e.g., the time it is determined that the primary battery component 130 is lower than the danger threshold) to the expected recharge time (e.g., the time at which recharge us expected to begin), which can be the time at which recharge of the primary battery component 130 is expected to begin. Generally, the inclusion of temporary data into the critical data 160 may be performed to reduce the likelihood that the user needs data that is unavailable on the secondary storage 120 when the mobile device 105 is in secondary mode. More specifically, the temporary data may be data that is identified based on historical usage data of the mobile device 105 to be likely needed by the user during the critical period. Various mechanisms known in the art may be used to determine tasks the user is likely to perform on a given day, based on historical usage data. Using one or more of such mechanisms, the compartmentalization system 100 may identify temporary data likely to be needed during the critical period. Analogously, the expected recharge time may also be determined based on historical usage data of the mobile device 105, and the determination may be made using methods known in the art.

For example, the compartmentalization system 100 could forecast that the mobile device 105 will switch from primary mode to secondary mode in 9 minutes, due to having 5% charge remaining in primary battery component 130. Furthermore, compartmentalization system 100 determined that its backup operation could consume the remaining power in the primary battery component 130. As such, the primary agent 150 may introspect the user's calendar, and may thus identify events, such as movie or a baseball game, scheduled for later on the same day. Given this information, the primary agent 150 may download the movie ticket or baseball game ticket from a remote server and may include the movie ticket or baseball ticket in the temporary data.

For another example, if it is determined that the user usually requires access to a digital public transportation pass at a time that falls within the critical period, then the compartmentalization system 100 may add the digital public transportation pass to the temporary data, and thus to the critical data 160 at least temporarily. For another example, if it is determined that the user often shops for groceries in the evening, during a time frame that may fall within the critical period, then the compartmentalization system 100 may include a payment card in the temporary data. In some embodiments of the invention, when the mobile device 105 recharges, the temporary data may be removed from the critical data 160.

In some embodiments of the invention, the temporary data may include authorization data generated to enable payment authorization for payments expected to be made during the critical period. This authorization data may be obtained automatically, with or without additional approval by the user for each instance. For example, upon determining that a specific payment (e.g., to a grocery store) is likely to be made during the critical period, the compartmentalization system 100 may communicate in the background with a payment provider of the user to request authorization to make a payment. That authorization request may include payment criteria, such as one or more of the following: an expected cost or range of cost, an expected type of purchase (e.g., groceries, prepared food, electronics), an expected point of purchase (e.g., the grocery store, city train), and an expected time range of purchase (e.g. 5:00-6:00 pm). In that case, upon approval, the payment provider may transmit to the mobile device 105 an authorization code, which may be added to the temporary data, and thereby included in the critical data 160. The authorization code may be provided at a point of purchase to enable the user to be charged. Thus, using the authorization code, the user may make a predicted purchase during the critical period, without the need to access the usual payment functionality, such as a mobile broadband network to gain approval from the payment provider. In some cases, a limited generic authorization code may also be reserved for an unspecified purchase. For example, a limit of 100 dollars may be approved by the payment company for the purchase of anything. Further, this generic authorization code may be limited by a global positioning system (GPS) location or other detected location of the purchase, or by time of the purchase. For example, at 5:00 in the afternoon, the primary agent 150 may submit a current GPS location to the payment company when the time arrives to switch from primary mode to secondary mode. In that case, the generic payment authorization may be limited to purchases within a 60-mile radius of the GPS location from 5:00 to 7:00 in the evening.

In some embodiments of the invention, the restrictions on the authorization code are based on the user's default configuration (e.g. $100 limit for a generic purchase, $50 limit for groceries), or based on the user's explicit verification prior to each authorization request. Alternatively, however, the compartmentalization system 100 may simply request one or more authorizations based on its predictions and then notify the user of the authorization details (e.g. dollar limit, location limit, etc.) after automatically submitting the authorization requests or after receiving approval from the payment company. In some embodiments of the invention, one authorization code may be used for multiple predicted purchases. For example, a single authorization code may be used for grocery shopping, the city bus, and a restaurant purchase. However, this single authorization code need not be generic, but may have restrictions for each allowed purchase. In that case, each of such purchases may have its own payment criteria for use of the authorization code, such as time range, cost range, etc. In some embodiments of the invention, however, each predicted purchase has a unique authorization code.

In some embodiments of the invention, the payment company stores the payment criteria during the authorization process. The available credit for predicted payments, as described in the payment criteria, may be reduced according to the amount authorized. When a payment is made by the mobile device 105 at the point of sale, the authorization code and the routing information of the payment company may be provided to a terminal at the point of sale. Based on the payment criteria, the payment company may determine whether to approve the transaction. In some embodiments of the invention, the payment company may choose to request additional authentication from the user. For example, and not by way of limitation, additional authentication may be performed through facial recognition is supported at the terminal, or through a verifying phone call to the point of sale, requiring the user to answer a question, submit to voice recognition, or provide a ZIP code of the user's home address.

The compartmentalization system 100 may request and receive one or more authorization codes, as described above. Each such authorization code may be included in the temporary data, which may be included in the critical data 160.

It will be understood that, although the identification of temporary data and the inclusion of the temporary data into the critical data 160 is described herein as being part of the method 200 for updating the critical data 160 stored in the secondary storage 120, this identification and inclusion may be performed separately. In other words, the determination of whether temporary data should be identified for inclusion in the critical data 160 may be performed independently of the method 200 to synchronize the critical data 160.

At block 245, the critical data 160 may be copied to the secondary storage 120, including temporary data that is included in the critical data 160. Specifically, the portion of the critical data 160 that has changed may be copied to the secondary storage 120. In some embodiments of the invention, the copied portion of the critical data 160 may replace the previous version of that portion of the critical data 160 in the secondary storage 120. Alternatively, however, the prior version may be retained in case the user wishes to revert to that prior version at a later point. The method 200 may then return to block 205, and this loop of the method 200 may repeat continuously or from time to time when the mobile device 105 is in its primary mode.

Figure 3:
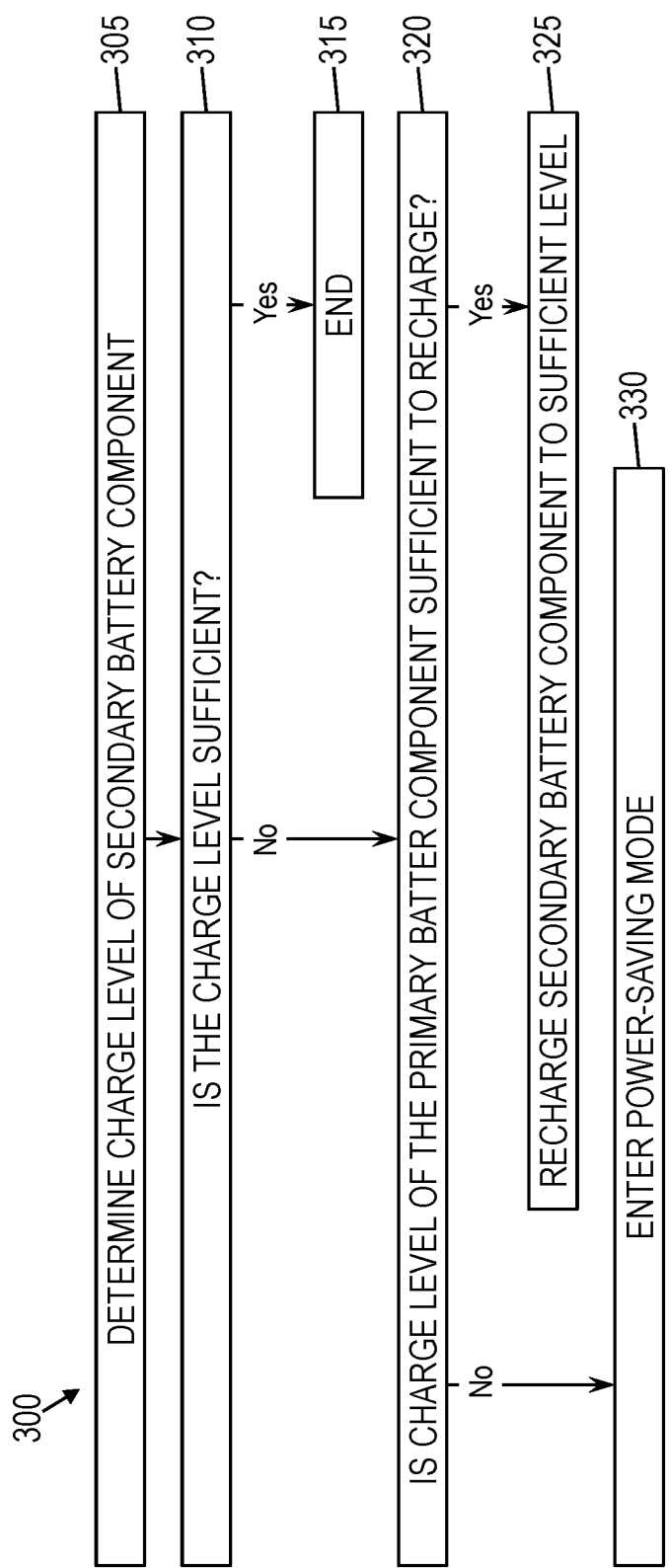
FIG. 3 is a flow diagram of a method of transferring a charge from a primary battery component to a secondary battery component of the mobile device having the compartmentalization system, according to some embodiments of the invention.

FIG. 3 is a flow diagram of a method 300 of transferring a charge from the primary battery component 130 to the secondary battery component 110 of the mobile device 105 having the compartmentalization system 100, according to some embodiments of the invention. This method 300 may be performed while the mobile device 105 is in primary mode. Generally, the primary battery component 130 may be responsible for keeping the secondary battery component 110 with enough power to deliver the critical data 160 to the user as needed when the mobile device 105 is in secondary mode. In some embodiments of the invention, it is not required that the secondary battery component 110 be full or close to full, but the compartmentalization system 100 may seek to ensure that the secondary battery component 110 retains a charge level sufficient for delivering the critical data 160 while the mobile device 105 is in secondary mode. Specifically, for instance, the compartmentalization system 100 may estimate when the mobile device 105 will begin recharging, based on historical usage data of the mobile device 105. The compartmentalization system 100 may retain enough charge level in the secondary battery component 110 for access of the critical data 160 until that time, or for a certain number of accesses.

At block 305 of FIG. 3, the charge level of the secondary battery component 110 may be determined. At decision block 310, it may be determined whether the charge level of secondary battery component 110 is sufficient for supporting a potential switch into secondary mode. For instance, in some embodiments of the invention, a secondary-battery threshold may be established, which may be a desirable charge level of the secondary battery component 110. This secondary-battery threshold may be fixed, having been established by default or by the user, or the secondary-battery threshold may be dynamic. In the latter case, for example, the secondary-battery threshold may be determined based on the expected critical period. Determining the secondary-battery threshold may include, for example, estimating the time remaining in the primary battery component 130, and estimating the time in which the mobile device 105 is expected to be in secondary mode after the primary battery component 130 dies and until the expected recharge time. Specifically, once the time remaining in primary mode is estimated, it can be assumed that the mobile device 105 will run in secondary mode for the remaining time until the expected recharge time. For another example, the secondary-battery threshold maybe be determined based on the count and type of events predicted to occur in the critical period, such as, for example, the number of purchases to be made or the number of entrance tickets to be used. Thus, the compartmentalization system 100 may set the secondary-battery threshold to ensure that the secondary battery component 110 has enough charge level to power the mobile device 105, specifically the secondary storage 120 and other internal devices 170 sought to be available in secondary mode, in secondary mode until the expected recharge time.

If the charge level of the secondary battery component 110 is sufficient, such that it meets the secondary-battery threshold, for example, then the method 300 may end at block 315. If the charge level of the secondary battery component 110 does not meet the secondary-battery threshold, then the method 300 may proceed to decision block 320.

At decision block 320, it may be determined whether the charge level of the primary battery component 130 is sufficient to recharge the secondary battery component 110. For instance, it may be determined whether the charge level of the primary battery component 130 meets a primary-battery threshold (e.g., 35%). Like the secondary-battery threshold, the primary-battery threshold may be static or dynamic. For example, and not by way of limitation, the primary-battery threshold may be dynamically set to equal a base threshold (e.g., 30%) plus the charge level by which the secondary battery component 110 needs to be increased to reach its secondary-battery threshold. In this case, transferring the charge level needed by the secondary battery component 110 may still keep the primary battery component 130 at or above this base threshold. Generally, the primary-battery threshold may exist to ensure that the primary battery component 130 does not transfer power it needs for its own use to the secondary battery component 110.

If the primary battery component 130 has a sufficient charge level (e.g., at least the primary-battery threshold), then the primary battery component 130 may transfer power to the secondary battery component 110 at block 325, thus charging the secondary battery component to a level deemed sufficient. Specifically, for instance, the amount of charge transferred may be enough to raise the charge level of secondary battery component 110 at least to the secondary-battery threshold. However, if the charge level of the primary battery component 130 is not sufficient, then the primary battery component 130 may enter a power-saving mode at block 330. In power-saving mode, various remedial activities may be performed to reduce the power consumption of primary battery component 130 while the mobile device 105 remains in primary mode, such as slowing down the CPU, reducing screen brightness, or turning off global positioning system (GPS) or other internal or attached devices.

Figure 4:
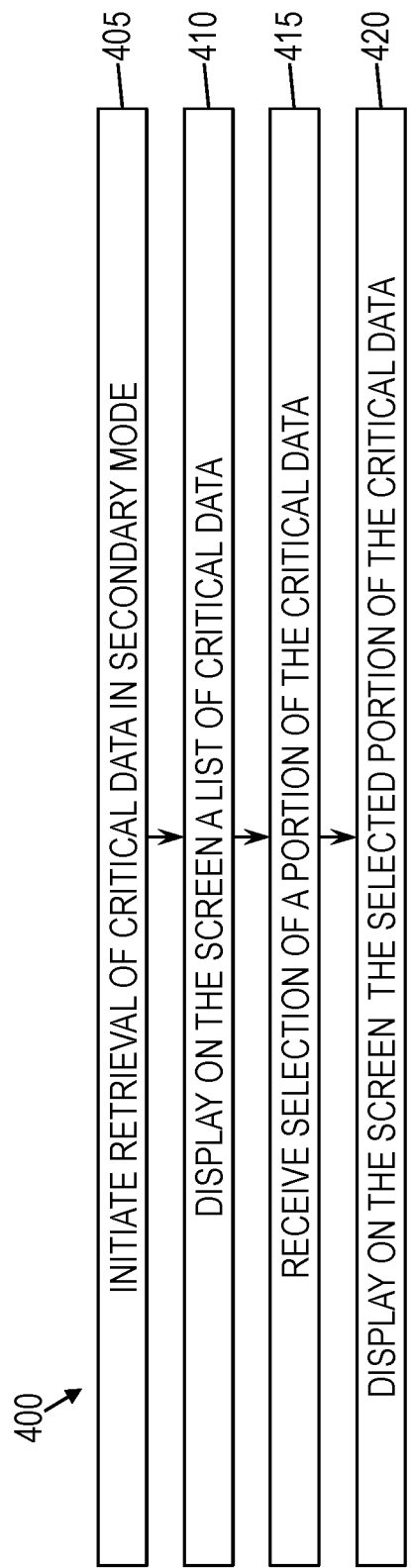
FIG. 4 is a flow diagram of a method of retrieving critical data from a secondary storage of the mobile device having the compartmentalization system, according to some embodiments of the invention.

FIG. 4 is a flow diagram of a method 400 of retrieving the critical data 160 from the secondary storage 120 of the mobile device 105 having the compartmentalization system 100, according to some embodiments of the invention. Specifically, this method 400 may apply when the mobile device 105 is in secondary mode. Various mechanisms may be used to retrieve data, and the mechanisms described herein are provided for illustrative purposes only. For example, retrieving the critical data 160 and presenting the critical data 160 in a form the user can utilize may require use of a screen, an NFC device, or a Bluetooth device. For instance, the screen may display the critical data 160. Alternatively, through a headless configuration, the NFC device or the Bluetooth device may transfer the critical data 160 to another device other than the mobile device 105. Further, it will be understood that each hardware component of the mobile device 105 utilized in retrieving the critical data 160 may be connected to and thus capable of being powered by the secondary battery component 110.

FIG. 4 specifically illustrates a method 400 of retrieving critical data 160 using a screen, specifically a touchscreen, of the mobile device 105. At block 405, the user may initiate retrieval of the critical data 160 while the mobile device 105 is in secondary mode. This initiation may occur by various mechanisms. For example, and not by way of limitation, pressing the home button twice may be interpreted as an implicit instruction to initiate such retrieval, or authorization of the user through the use of a fingerprint scanner integrated into the mobile device 105 may be interpreted as such an instruction.

At block 410, the screen may turn on and display a list of available critical data 160. Each item in the list may represent a piece or portion of the critical data 160, but the entire content of the critical data 160 itself need not be displayed.

At block 415, the compartmentalization system 100 may receive a selection of a list item representing a portion of the critical data 160. This selection may be received when the user touches the screen to make the selection, for example. At block 420, the compartmentalization system 100 may display on the screen the portion of the critical data 160 corresponding to the selected list item.

Figure 5:
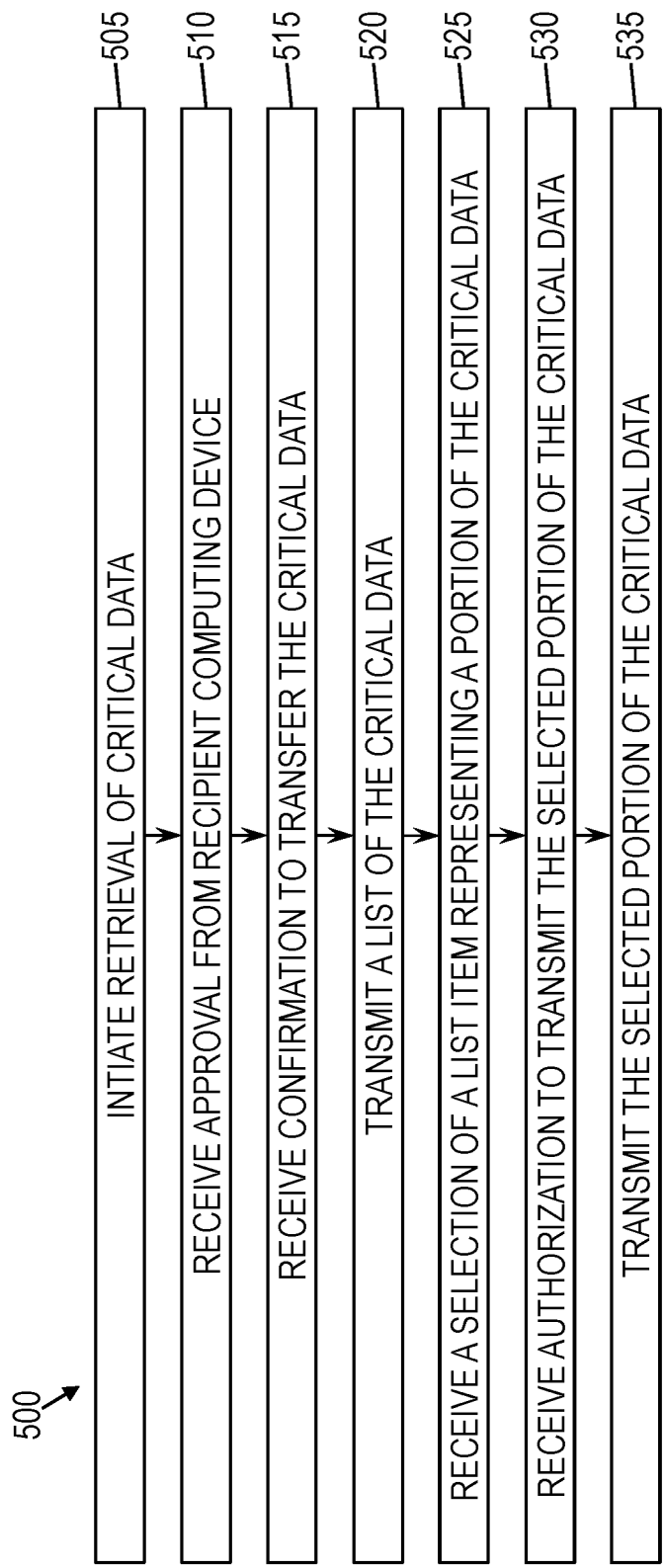
FIG. 5 is another flow diagram of a method of retrieving critical data from the secondary storage of the mobile device having the compartmentalization system, according to some embodiments of the invention.

FIG. 5 is another flow diagram of a method of retrieving the critical data 160 from the secondary storage 120 of the mobile device 105 having the compartmentalization system 100, according to some embodiments of the invention. In this example method 500, an internal device 170, specifically a communication device (e.g., NFC, Bluetooth), of the mobile device 105 may be used to transfer the critical data 160 from the mobile device 105 to a recipient computing device, such as another mobile device 105. However, it will be understood that critical data 160 could also be transferred to other types of computing devices, such as a payment card scanner during a purchase. The communication device may be a wireless communication device, such as NFC or Bluetooth, or may be a wired communication device, such as universal serial bus (USB). Using of the communication device, as described in the example below, the critical data 160 may be retrieved through a headless mechanism.

At block 505, the user initiates retrieval of the critical data 160. This can be done in various ways, such as by pressing a home button of the mobile device 105 twice. or by scanning an authorized fingerprint. At block 510, the recipient computing device may approve a connection to the mobile device 105 for receipt of the critical data 160. This approval may be made by a second user at the recipient computing device, for example. As such, the recipient computing device waits for the data transfer. At block 515, the compartmentalization system 100 may receive confirmation of the instruction to transfer the critical data 160. For instance, this confirmation may be given implicitly when the user scans an authorized fingerprint, and the mobile device 105 thus receives the authorized fingerprint.

At block 520, the compartmentalization system 100 may transfer to the recipient computing device a list of available critical data 160, which the recipient computing device may display on its screen. At block 525, the recipient computing device may transmit a selection of a list item to the mobile device 105, where the list item represents a portion of the critical data 160. This selection may have been made, for example, by the second user of the recipient computing device. At block 530, the compartmentalization system 100 may receive authorization to transmit the selected critical data 160. For instance, this authorization may be in the form of an authorized fingerprint scanned by the fingerprint scanner. At block 535, the compartmentalization system 100 may thus transmit the selected critical data 160 to the recipient computing device. For instance, this method 500 or a similar method may be used to transmit critical data 160 from a user's mobile device 105, specifically a mobile phone, to the user's smart watch. The critical data 160 may then become available on the recipient computing device while the mobile device 105 is in secondary mode, even if the screen of the mobile device 105 is inoperable in secondary mode.

In some embodiments of the invention, the critical data 160 that is available to the user may vary based on the location (e.g., the GPS location of the mobile device 105). For example, and not by way of limitation, if the critical data 160 includes multiple authorization codes, then one or more may be selected for use based on location. For instance, after retrieval of the critical data 160 has been initiated, the secondary agent 155 may determine the current location and may thus retrieve an authorization code whose payment criteria is met, or not violated, by the current location. Upon receiving a selection of an authorization code in the critical data 160, the secondary agent may display the authorization code, which can be shown to personnel at a point of sale or may be transmitted to a terminal via NFC, Bluetooth, or other communication mechanism.

An authorization code, or other critical data 160, may be selected and used according to a pre-established protocol, in some cases. For example, when the user initiates payment by way of an authorization code in the critical data 160, such as by pressing a home button of the mobile device 105, the secondary agent 155 may transmit a message to request identifying information from a nearby point-of-sale terminal. When the terminal responds with identifying information, the secondary agent 155 may retrieve a payment authorization code based on that identifying information, such as by comparing the identifying information to the payment criteria of available authorization codes in the critical data 160. For example, and not by way of limitation, the identifying information may include a unique identifier among point-of-sale terminals, may uniquely identify a type of merchant (e.g., a grocery store, public transportation), or may identify the type of purchase was scanned by the sale terminal (e.g., meat, canned food). In some embodiments of the invention, the secondary agent 155 verifies that the location (e.g., via GPS) of the terminal matches the payment criteria of an applicable authorization code in the critical data 160. If an authorization code is found such that the respective payment criteria matches the identifying information, the compartmentalization system 100 may make that authorization code available for use. For instance, the authorization code may be shown to personnel at a point of sale or may be transmitted to the point-of-sale terminal via NFC, Bluetooth, or other communication mechanism.

Figure 6:
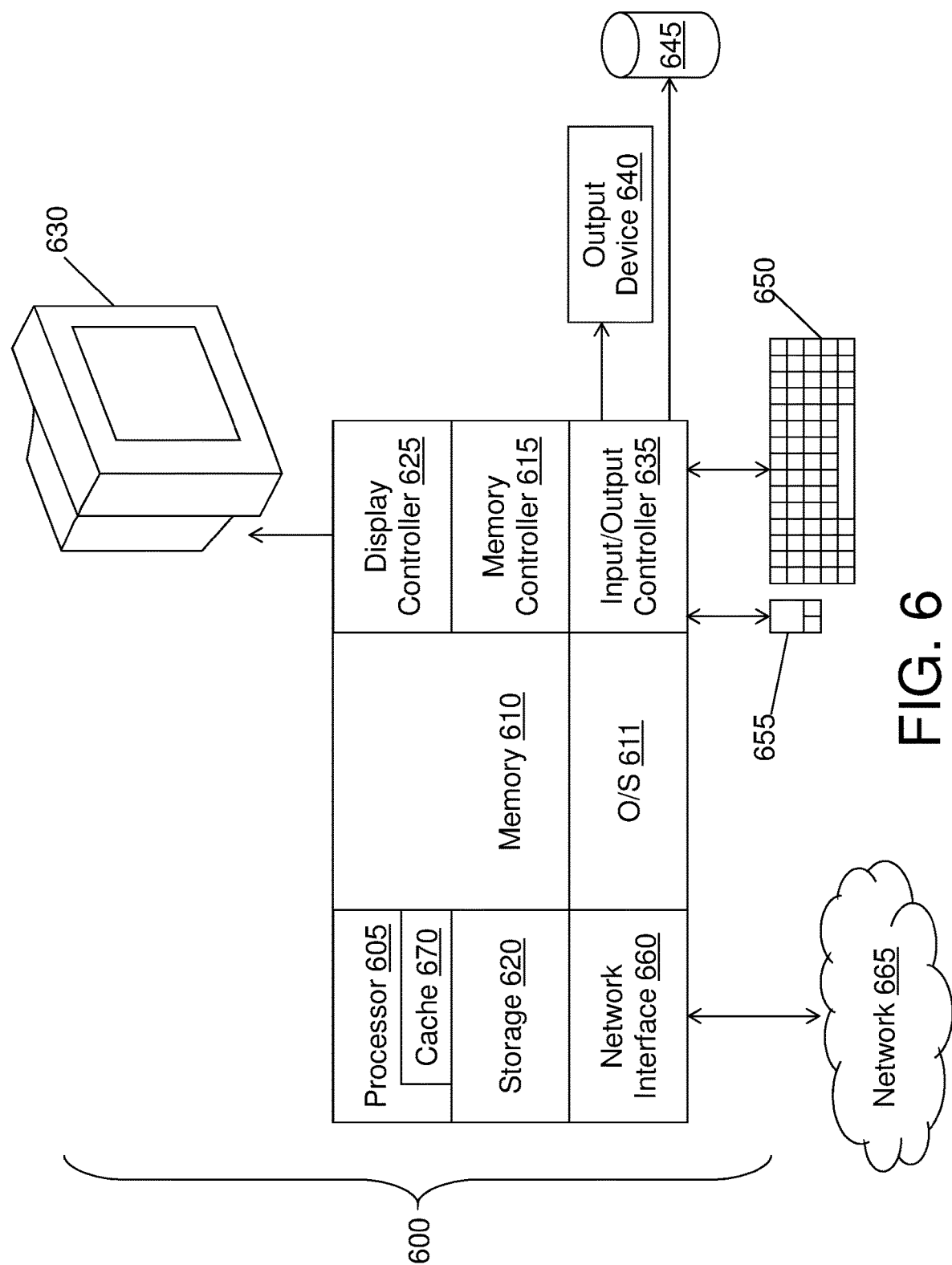
FIG. 6 is a block diagram of a computer system for implementing some or all aspects of the compartmentalization system, according to some embodiments of this invention.

FIG. 6 is a block diagram of a computer system 600 for implementing some or all aspects of the compartmentalization system 100, according to some embodiments of this invention. The compartmentalization systems 100 and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer. For instance, the mobile device 105 in which the compartmentalization system 100 is integrated may be a computer system 600 as shown in FIG. 6.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor-based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid-state drive. The stored instructions in memory 610 or in storage 620 may include those enabling the processor to execute one or more aspects of the compartmentalization systems 100 and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Compartmentalization systems 100 and methods according to this disclosure may be embodied, in whole or in part, in computer program products or in computer systems 600, such as that illustrated in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
identifying critical data on a primary storage of a mobile device, wherein the mobile device includes a plurality of internal devices including the primary storage that receive power from the primary battery component during the primary mode;
backing up the critical data from the primary storage to a secondary storage;
detecting a charge level of the primary battery component;
determining that the charge level of the primary battery component is less than a minimum threshold;
switching the mobile device from a primary mode to a secondary mode, based on the charge level being less than the minimum threshold;
predicting temporary data that will be accessed during a critical period extending until an expected recharge time of the mobile device; and
adding the temporary data to the critical data, wherein the temporary data is backed up from the primary storage to the secondary storage,
wherein a secondary battery component only powers fewer than all of the plurality of internal devices including the secondary storage during the secondary mode.

2. The computer-implemented method of claim 1, wherein:
the predicting the temporary data that will be accessed during the critical period comprises:
predicting an expenditure; and
obtaining an authorization code to pay for the expenditure, wherein the authorization code is associated with payment criteria describing the expenditure; and
the adding the temporary data to the critical data, wherein the temporary data is backed up from the primary storage to the secondary storage, comprises adding the authorization code to the critical data.

3. The computer-implemented method of claim 1, further comprising:
estimating a power required to back up the critical data;
wherein the backing up the critical data from the primary storage to the secondary storage is performed based at least in part on the charge level of the primary battery component and on the power required to back up the critical data.

4. The computer-implemented method of claim 1, further comprising:
detecting a charge level of the secondary battery component;
determining that the charge level of the secondary battery component is below a secondary-battery threshold; and
recharging the secondary battery component with the primary battery component, based at least in part on the secondary battery component being below the secondary-battery threshold.

5. The computer-implemented method of claim 1, further comprising:
receiving an instruction to provide access to the critical data in the secondary mode; and
displaying the critical data on a screen of the mobile device, responsive to the instruction;
wherein the screen of the mobile device is powered by the secondary battery component in the secondary mode, and wherein the screen of the mobile device is powered by the primary battery component in the primary mode.

6. The computer-implemented method of claim 1, further comprising:
receiving an instruction to provide access to the critical data in the secondary mode; and
transmitting the critical data to a recipient computing device through a communication device of the mobile device, responsive to the instruction and the approval;
wherein the communication device of the mobile device is powered by the secondary battery component in the secondary mode, and wherein the communication device of the mobile device is powered by the primary battery component in the primary mode.

7. The computer-implemented method of claim 1, wherein a plurality of internal devices of the mobile device are powered by the primary battery component, and wherein a proper subset of the plurality of internal devices of the mobile device are further powered by the secondary battery component.

8. The system of claim 7, the computer-readable instructions further comprising:
estimating a power required to back up the critical data;
wherein the backing up the critical data from the primary storage to the secondary storage is performed based at least in part on the charge level of the primary battery component and on the power required to back up the critical data.

9. The computer-implemented method of claim 1, wherein the temporary data is identified based on historical usage data of the mobile device to be needed by the user during the critical period.

10. A system comprising:
a memory having computer-readable instructions; and
one or more processors for executing the computer-readable instructions, the computer-readable instructions comprising:
identifying critical data on a primary storage of a mobile device, wherein the mobile device includes a plurality of internal devices including the primary storage that receive power from the primary battery component during the primary mode;
backing up the critical data from the primary storage to a secondary storage;
detecting a charge level of the primary battery component;
determining that the charge level of the primary battery component is less than a minimum threshold;
switching the mobile device from a primary mode to a secondary mode, based on the charge level being less than the minimum threshold;

predicting temporary data that will be accessed during a critical period extending until an expected recharge time of the mobile device; and adding the temporary data to the critical data, wherein the temporary data is backed up from the primary storage to the secondary storage, wherein a secondary battery component only powers fewer than all of the plurality of internal devices including the secondary storage during the secondary mode.

11. The system of claim 10, the computer-readable instructions further comprising:

detecting a charge level of the secondary battery component;

determining that the charge level of the secondary battery component is below a secondary-battery threshold; and recharging the secondary battery component with the primary battery component, based at least in part on the secondary battery component being below the secondary-battery threshold.

12. The system of claim 10, the computer-readable instructions further comprising:

receiving an instruction to provide access to the critical data in the secondary mode; and displaying the critical data on a screen of the mobile device, responsive to the instruction;

wherein the screen of the mobile device is powered by the secondary battery component in the secondary mode, and wherein the screen of the mobile device is powered by the primary battery component in the primary mode.

13. The system of claim 10, the computer-readable instructions further comprising:

receiving an instruction to provide access to the critical data in the secondary mode; and transmitting the critical data to a recipient computing device through a communication device of the mobile device, responsive to the instruction and the approval;

wherein the communication device of the mobile device is powered by the secondary battery component in the secondary mode, and wherein the communication device of the mobile device is powered by the primary battery component in the primary mode.

14. A computer-program product for implementing a secondary compartment of a mobile device, the computer-program product comprising a computer-readable storage medium having program instructions embodied therewith, the program instructions executable by a processor to cause the processor to perform a method comprising:

identifying critical data on a primary storage of a mobile device, wherein the mobile device includes a plurality of internal devices including the primary storage that receive power from the primary battery component during the primary mode;

backing up the critical data from the primary storage to a secondary storage;

detecting a charge level of the primary battery component;

determining that the charge level of the primary battery component is less than a minimum threshold;

switching the mobile device from a primary mode to a secondary mode, based on the charge level being less than the minimum threshold;

predicting temporary data that will be accessed during a critical period extending until an expected recharge time of the mobile device; and adding the temporary data to the critical data, wherein the temporary data is backed up from the primary storage to the secondary storage, wherein a secondary battery component only powers the fewer than all of the plurality of internal devices including the secondary storage during the secondary mode.

15. The computer-program product of claim 14, the method further comprising:

estimating a power required to back up the critical data;

wherein the backing up the critical data from the primary storage to the secondary storage is performed based at least in part on the charge level of the primary battery component and on the power required to back up the critical data.

16. The computer-program product of claim 14, the method further comprising:

detecting a charge level of the secondary battery component;

determining that the charge level of the secondary battery component is below a secondary-battery threshold; and recharging the secondary battery component with the primary battery component, based at least in part on the secondary battery component being below the secondary-battery threshold.

17. The computer-program product of claim 14, the method further comprising:

receiving an instruction to provide access to the critical data in the secondary mode; and displaying the critical data on a screen of the mobile device, responsive to the instruction;

wherein the screen of the mobile device is powered by the secondary battery component in the secondary mode, and wherein the screen of the mobile device is powered by the primary battery component in the primary mode.

18. The computer-program product of claim 14, the method further comprising:

receiving an instruction to provide access to the critical data in the secondary mode; and transmitting the critical data to a recipient computing device through a communication device of the mobile device, responsive to the instruction and the approval;

wherein the communication device of the mobile device is powered by the secondary battery component in the secondary mode, and wherein the communication device of the mobile device is powered by the primary battery component in the primary mode.

* * * * *